(12) United States Patent
Kato

(10) Patent No.: US 7,167,248 B2
(45) Date of Patent: Jan. 23, 2007

(54) REFLECTION-TYPE OPTICAL SENSOR, CARRIAGE, AND DATA PROCESSING DEVICE

(75) Inventor: Tetsuya Kato, Chiryu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 326 days.

(21) Appl. No.: 10/724,612

(22) Filed: Dec. 2, 2003

(65) Prior Publication Data

US 2004/0108474 A1 Jun. 10, 2004

(30) Foreign Application Priority Data

Dec. 4, 2002 (JP) ............................. 2002-352825

(51) Int. Cl.
*G01N 21/47* (2006.01)

(52) U.S. Cl. ...................................... 356/446; 250/239

(58) Field of Classification Search ........ 356/445–448; 250/239
See application file for complete search history.

(56) References Cited

U.S. PATENT DOCUMENTS

| | | | |
|---|---|---|---|
| 3,740,562 A * | 6/1973 | Fertig ................... | 250/559.45 |
| 3,842,263 A | 10/1974 | Kornrumpf et al. | |
| 4,412,129 A | 10/1983 | Duncan | |
| 4,983,854 A | 1/1991 | Mizuno et al. | |
| 5,463,212 A * | 10/1995 | Oshima et al. ............. | 235/468 |
| 5,793,037 A * | 8/1998 | Guillot et al. .............. | 250/239 |
| 5,811,798 A | 9/1998 | Maurin et al. | |
| 5,925,889 A | 7/1999 | Guillory et al. | |
| 6,153,887 A | 11/2000 | Furuta | |

FOREIGN PATENT DOCUMENTS

| | | |
|---|---|---|
| FR | 2 588 385 | 4/1987 |
| JP | S 50-40277 | 4/1975 |
| JP | U-63-200354 | 12/1988 |
| JP | A 2-81846 | 3/1990 |
| JP | H 05-087538 | 4/1993 |
| JP | A 6-222156 | 8/1994 |
| JP | A-07-324979 | 12/1995 |
| JP | A 07-333007 | 12/1995 |
| JP | A 10-068759 | 3/1998 |
| JP | A 2000-227359 | 8/2000 |
| JP | A 2001-343468 | 12/2001 |
| JP | A 2002-068528 | 3/2002 |
| JP | A 2002-286419 | 10/2002 |

* cited by examiner

*Primary Examiner*—Richard A. Rosenberger
(74) *Attorney, Agent, or Firm*—Oliff & Berridge, PLC

(57) ABSTRACT

A media sensor 68 includes a cap 85 with a common opening 85b for restricting the beam spread of light emitted from a light-emitting element 82 and the range of light receivable by a light-receiving element 83, while suppressing the effects of disturbance. Accordingly, the media sensor 68 can prevent a decline in detection accuracy while using inexpensive elements with low directivity. Since the light-emitting element 82 and light-receiving element 83 are oriented perpendicularly to the paper P, the media sensor 68 is superior to sensors equipped with elements disposed at an angle to the paper P by avoiding a decline in detection accuracy caused by errors in the angular positioning of the elements, errors in angular positioning of the sensor itself, and the like, and by reducing the space required in the sensor to dispose the elements, thereby reducing the size of the sensor.

25 Claims, 9 Drawing Sheets

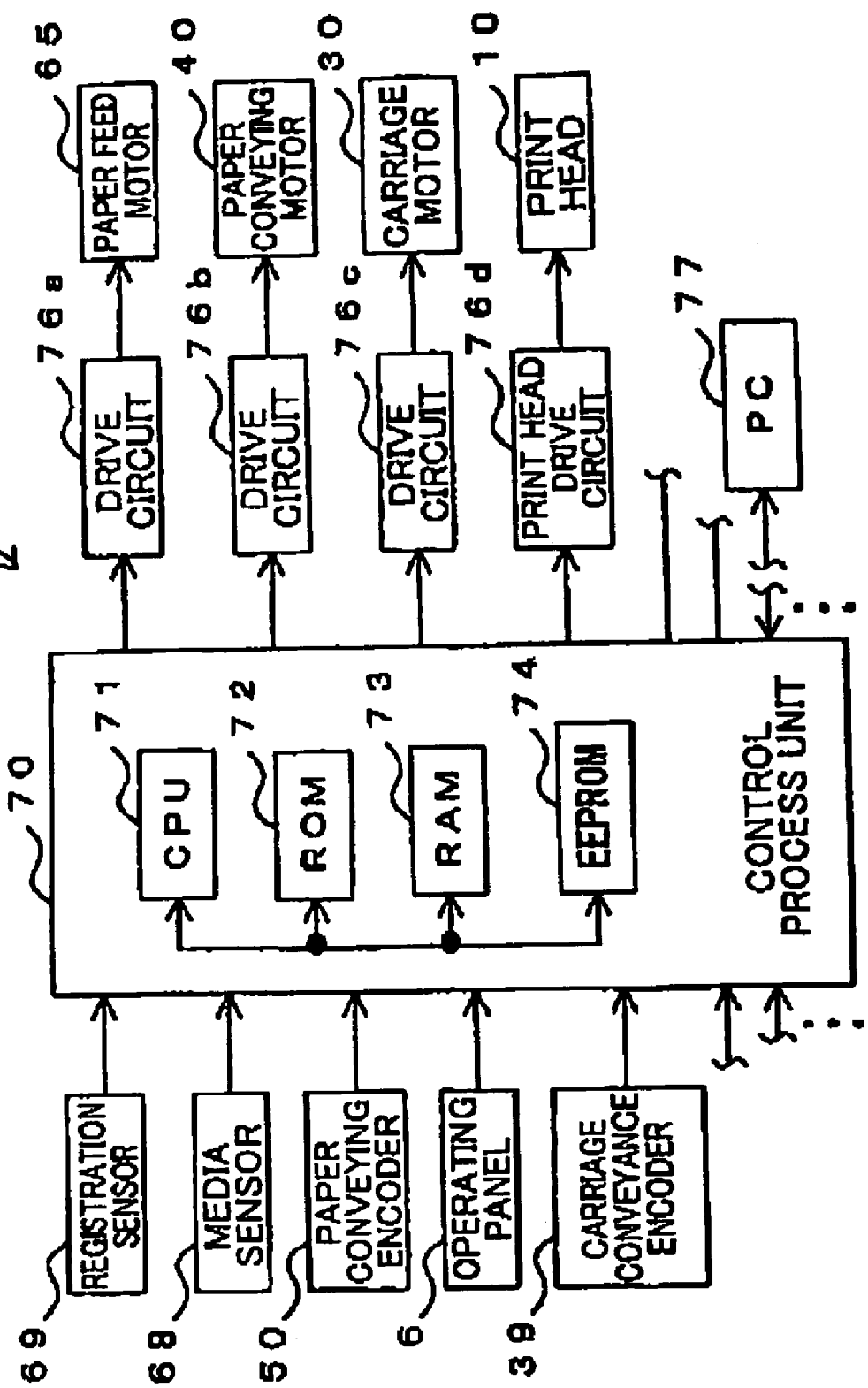

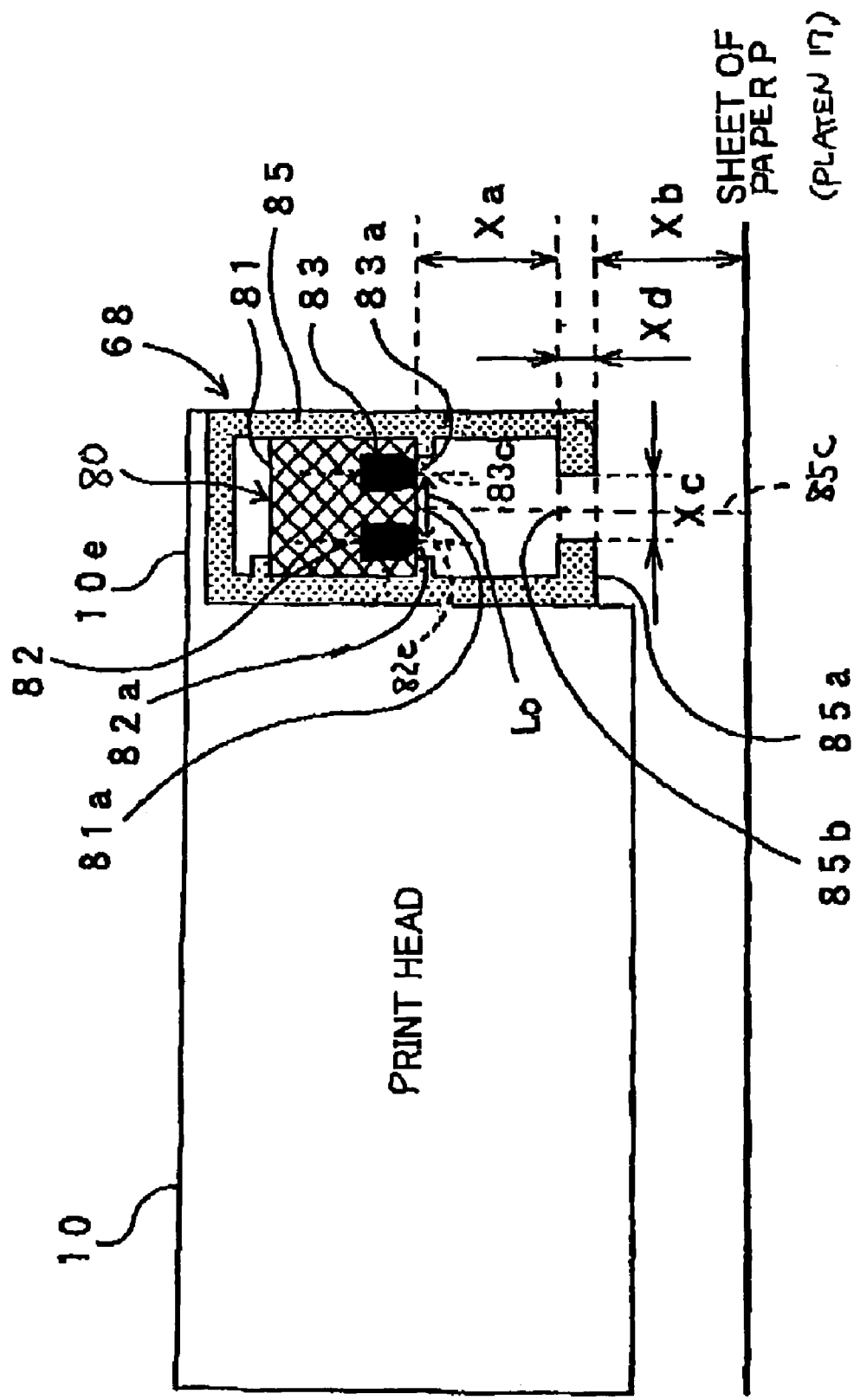

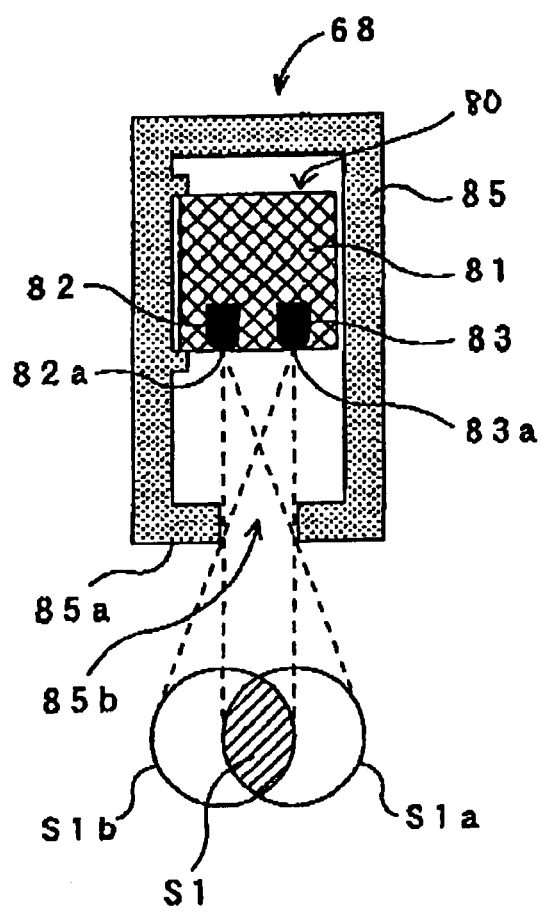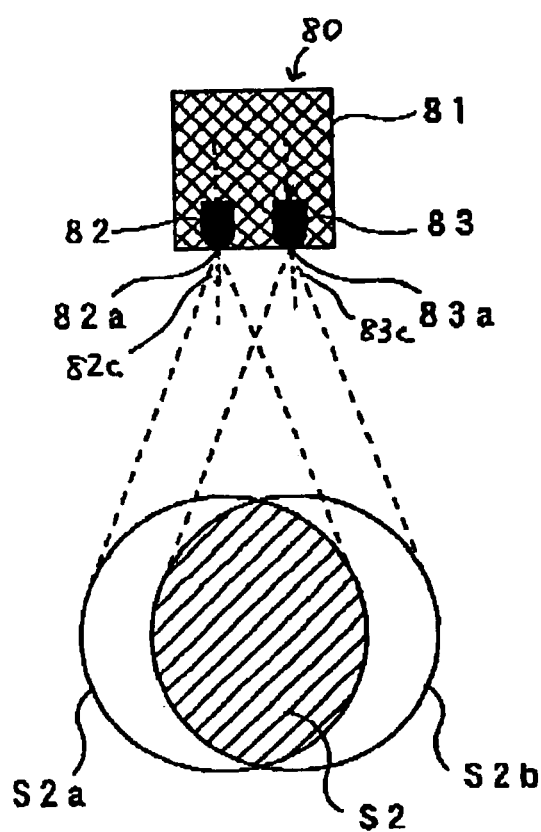

REFLECTION-TYPE OPTICAL SENSOR, CARRIAGE, AND DATA PROCESSING DEVICE

BACKGROUND OF THE INVENTION

1. Field of the Invention

The present invention relates to a reflection-type optical sensor having a light-emitting element and a light-receiving element for detecting an object, a carriage capable of moving over the object to be detected, and a data processing device that performs a data control process for the object while the object is moved.

2. Description of Related Art

A reflection-type optical sensor such as that disclosed in Japanese unexamined patent application publication No. HEI-6-222156 is well known in the art for detecting objects with a light-emitting element and a light-receiving element. The light-emitting and light-receiving elements of the reflection-type optical sensor are disposed at different angles in relation to the object. The light-emitting element emits a beam of light at a prescribed incident angle on the object, while the light-receiving element detects the presence of the object upon receiving light reflected from the object.

In order that light emitted from the light-emitting element can be reliably reflected onto the light-receiving element, the reflection-type optical sensor is configured with a light-emitting element having high directivity (a narrow beam spread) and a light-receiving element having high directivity (narrow light receiving angle)

SUMMARY OF THE INVENTION

The reflection-type optical sensor can detect an object by being mounted on a carriage, for example, that is configured to move over the object. The reflection-type optical sensor can also be used in a data processing device that performs a data control process for the object, when the object is moved by some moving mechanism.

However, in the reflection-type optical sensor of the aforementioned publication, a slight variation in the incident angle of emitted light can cause a large change in the angle of reflected light, making it impossible for the light-receiving element to receive the reflected light. Therefore, the positions (angles) at which the light-emitting element and light-receiving element are disposed in relation to the object must be set precisely so that the incident angle of the light-emitting element is equivalent to the receiving angle of the light-receiving element. However, even a slight error in positioning can greatly influence errors in detection, and it is difficult to position the elements precisely.

Alternatively, there exist in the art a light-emitting element and light-receiving element having low directivity (a wide beam spread of emitted light and a wide receiving angle) that are inexpensive and allow greater error in the positioning angles. If a reflection-type optical sensor were configured of these light-emitting and light-receiving elements, this conceivable reflection-type optical sensor can suppress decreases in detection precision caused by errors in the angular positioning and can be provided at a lower cost.

However, the conceivable reflection-type optical sensor configured of light-emitting and light-receiving elements having low directivity is capable of detecting an object over a wide area. This reduces detection accuracy when the desired area of detection is narrower. More specifically, the conceivable reflection-type optical sensor using elements with low directivity are strongly affected by disturbance light reflected from regions outside the desired area of detection due to the wide spread of the beam emitted from the light-emitting element and the broad angle of reception by the light-receiving element. This disturbance may lower the detection accuracy of the reflection-type optical sensor.

A carriage or a data processing device configured with this reflection-type optical sensor has lower detection accuracy due to the effects of disturbance in areas outside the desired detection area. Accordingly, the carriage or data processing device has poor accuracy when detecting positioning of the object.

Further, when the light-emitting element and light-receiving element are positioned facing the object from differing angles, the reflection-type optical sensor with this construction has to be configured with a larger capacity in order to ensure enough internal space for accommodating this arrangement of elements. When the sensor is larger the number of applications for the sensor becomes limited due to the limited available space for installing the sensor, for example.

In view of the foregoing, it is an object of the present invention to provide a reflection-type optical sensor capable of suppressing a reduction in detection accuracy due to errors in the angular positioning of the elements, while keeping costs down, and capable of suppressing a reduction in detection accuracy due to external disturbances, while being manufactured at a reduced size.

It is another object of the present invention to provide a carriage and a data processing device provided with this type of reflection-type optical sensor.

In order to attain the above and other objects, the present invention provides a reflection-type optical sensor for detecting an object, the sensor comprising: a light-emitting element having a central axis extending in a predetermined direction that extends substantially normal to a surface of an object to be detected and having a light-emitting portion that emits a detecting light onto the surface of the object, the detecting light traveling toward the surface of the object to define an irradiated region on the object; a light-receiving element having a central axis extending parallel with the central axis of the light-emitting element and having a light-receiving portion that receives a reflected light that has reflected off a reflecting region on the object, the reflecting region and the irradiated region overlapping at an overlapping region on the surface of the object; and a restricting member having a restricting portion defining an opening that allows a part of the detecting light and a part of the reflected light to pass therethrough, the restricting portion restricting a size of the opening to reduce an area of the overlapping region on the surface of the object.

According to another aspect, the present invention provides a carriage for moving over an object and for detecting the object, the carriage comprising: a moving member that moves over the object; and a detecting unit that is provided on the moving member and that detects the object to determine a position of the object, the detecting unit including a reflection-type optical sensor, the reflection-type optical sensor including: a light-emitting element having a central axis extending in a predetermined direction that extends substantially normal to a surface of the object to be detected and having a light-emitting portion that emits a detecting light onto the surface of the object, the detecting light traveling toward the surface of the object to define an irradiated region on the object, a light-receiving element having a central axis extending parallel with the central axis of the light-emitting element and having a light-receiving portion that receives a reflected light that has reflected off a reflecting region on the object, the reflecting region and the irradiated region overlapping at an overlapping region on the surface of the object; and a restricting member having a restricting portion defining an opening that allows a part of the detecting light and a part of the reflected light to pass therethrough, the restricting portion restricting a size of the opening to reduce an area of the overlapping region on the surface of the object.

According to another aspect, the present invention provides a data processing device, comprising: a moving member that moves over an object; a detecting unit that moves together with the moving member and that detects the object, the detecting unit including a reflection-type optical sensor for detecting an edge of the object, the reflection-type optical sensor including: a light-emitting element having a central axis extending in a predetermined direction that extends substantially normal to a surface of the object to be detected and having a light-emitting portion that emits a detecting light onto the surface of the object, the detecting light traveling toward the surface of the object to define an irradiated region on the object; a light-receiving element having a central axis extending parallel with the central axis of the light-emitting element and having a light-receiving portion that receives a reflected light that has reflected off a reflecting region on the object, the reflecting region and the irradiated region overlapping at an overlapping region on the surface of the object; and a restricting member having a restricting portion defining an opening that allows a part of the detecting light and a part of the reflected light to pass therethrough, the restricting portion restricting a size of the opening to reduce an area of the overlapping region on the surface of the object; a movement control unit controlling the moving member to move reciprocally; an object moving unit moving the object in a direction different from the direction, in which the movement control unit controls the moving member to move; and a process executing unit that is moved together with the moving member and that performs, based on detection results obtained by the detecting unit, a data control process including at least one of a data adding process for adding data to the object and a data acquiring process for acquiring data from the object.

BRIEF DESCRIPTION OF THE DRAWINGS

In the drawings;

FIG. 3 is a block diagram showing the electrical configuration of a control process unit provided in the multifunction device;

FIG. 4 is an explanatory diagram showing the cross-sectional structure of a media sensor mounted on a carriage (print head) provided in the multifunction device;

FIG. 5(a) is an explanatory diagram showing a target detection area of the media sensor;

FIG. 5(b) is an explanatory diagram showing a target detection area of a main sensor unit;

DETAILED DESCRIPTION OF THE PREFERRED EMBODIMENT

Figure 1:
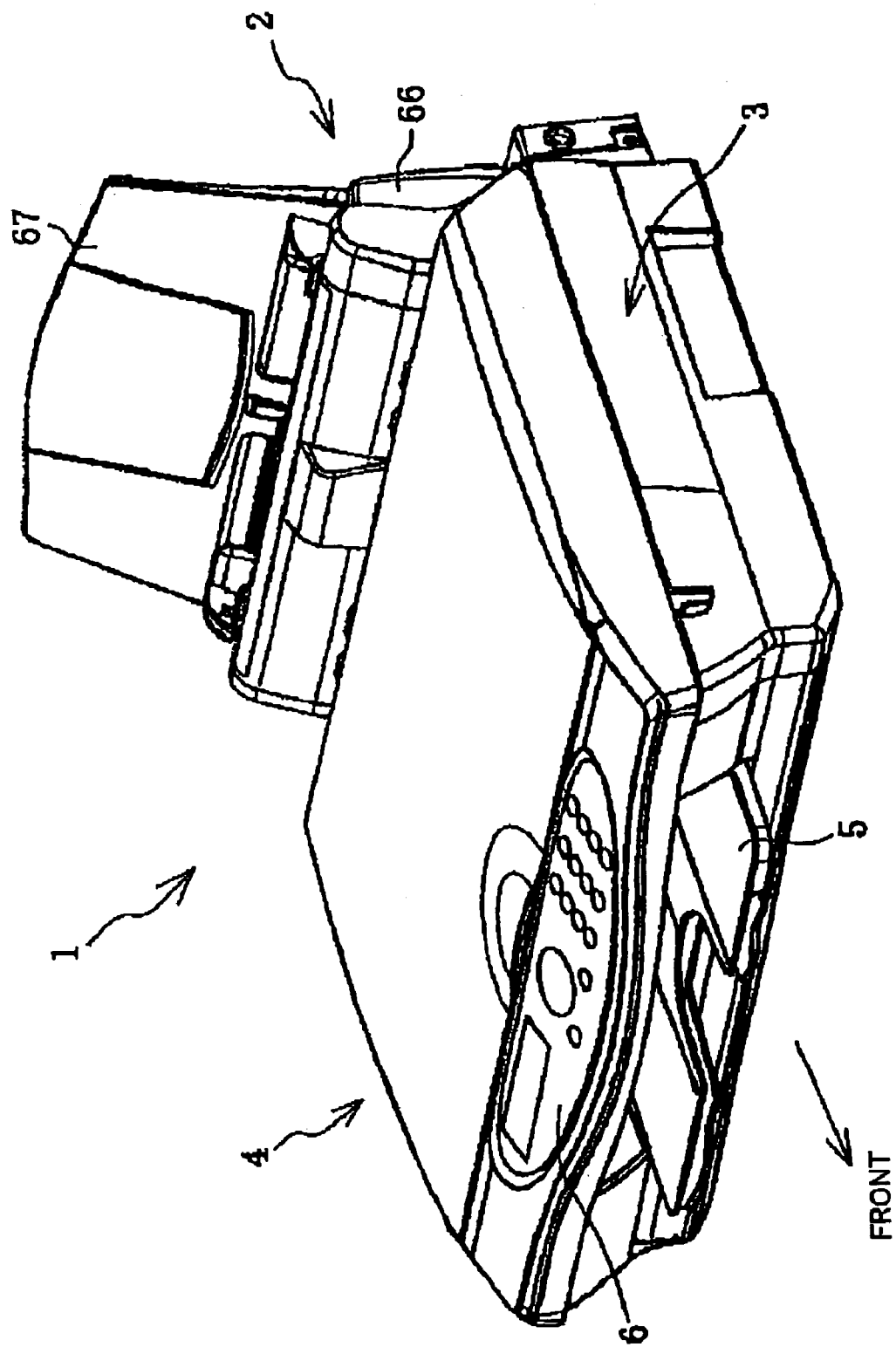
FIG. 1 is a perspective view showing a multifunction device equipped with a printer function, copier function, scanner function, facsimile function, and telephone function.

A reflection-type optical sensor, a carriage, and a data processing device according to a preferred embodiment of the present invention will be described while referring to the accompanying drawings wherein like parts and components are designated by the same reference numerals to avoid duplicating description.

FIG. 1 is a perspective view of a multifunction device 1 of the preferred embodiment, to which the present invention is applied. The multifunction device has a printer function, a copier function, a scanner function, a facsimile function, a telephone function, and the like.

As shown in FIG. 1, a paper supplying unit 2 is provided in the rear section of the multifunction device 1. An inkjet printer 3 is provided in front of and below the paper supplying unit 2. A scanning unit 4 for implementing the copier function and facsimile function is provided above the printer 3. A discharge tray 5 is provided on the front side of the printer 3. An operating panel 6 is provided on the top surface on the front end of the scanning unit 4.

The paper supplying unit 2 includes a sloped wail section 66 for maintaining paper in a sloped posture, and an extended paper guide plate 67 detachably mounted on the wall section 66. A plurality of sheets of paper can be stacked in the paper supplying unit 2. A paper feed motor 65 (see FIG. 3), a feeding roller (not shown) and the like are built into the wall section 66. When driven to rotate by the paper feed motor 65, the feeding roller conveys a sheet of paper toward the printer 3.

Figure 2:
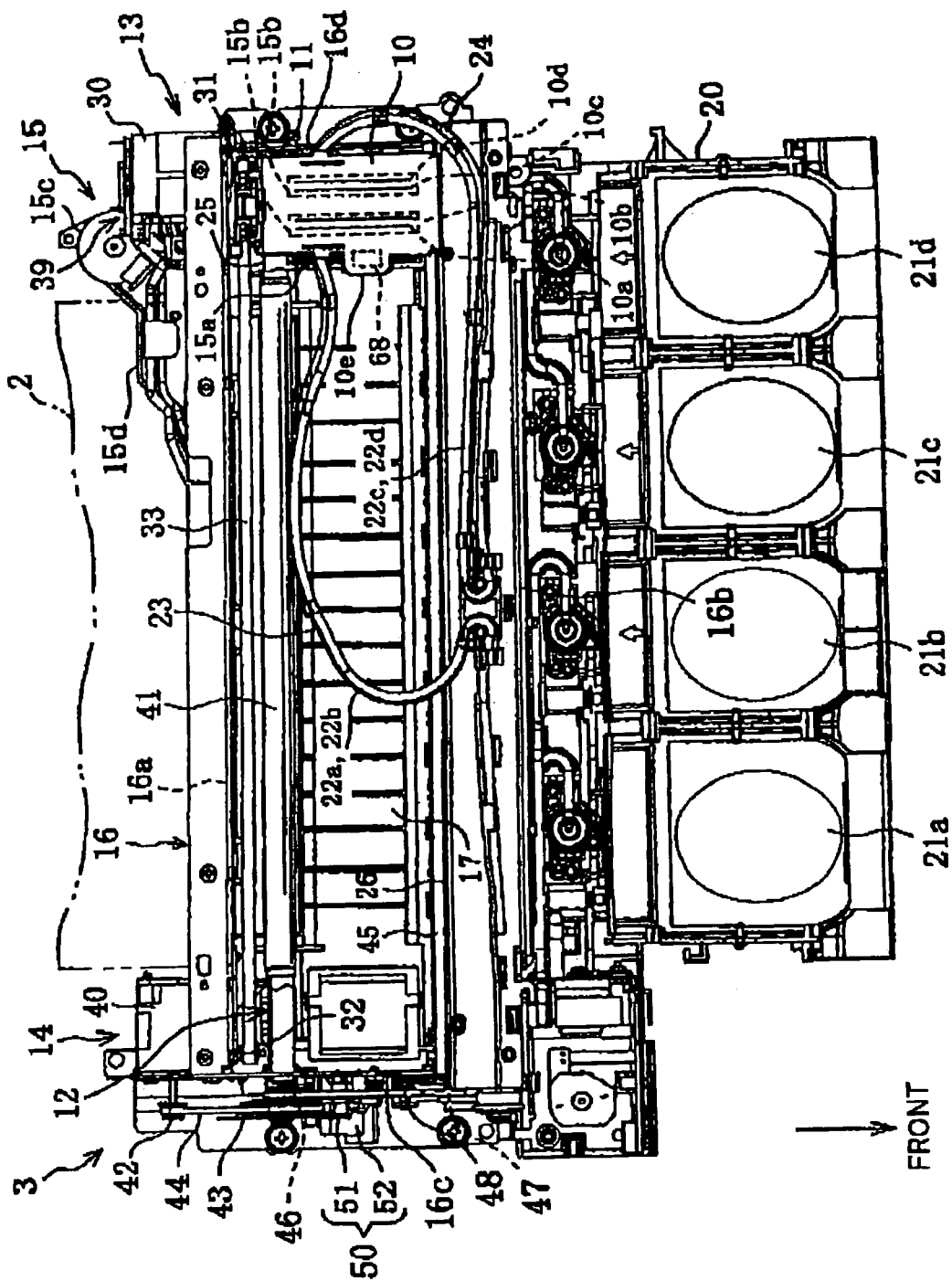
FIG. 2 is a plan view showing the internal construction of a printer provided in the multifunction device.

Next the printer 3 will be described in greater detail. FIG. 2 is a plan view showing the internal construction of the printer 3.

As shown in FIG. 2, the printer 3 includes a print head 10, a carriage 11, a guide mechanism 12, a carriage moving mechanism 13, a paper conveying mechanism 14, and a maintenance mechanism 15 for the print head 10. The print head 10 is mounted on the carriage 11. The guide mechanism 12 supports and guides the carriage 11 so that the carriage 11 can move reciprocally in a scanning direction, which is the left-to-right direction in FIG. 2. The carriage moving mechanism 13 moves the carriage 11 in the left-to-right direction. The paper conveying mechanism 14 conveys paper supplied by the paper supplying unit 2.

A rectangular frame 16 that is long in the left-to-right dimension and that is short in the front-to-rear direction is provided in the printer 3. Various components are mounted on the rectangular frame 16, including the guide mechanism 12, carriage moving mechanism 13, paper conveying mechanism 14, and maintenance mechanism 15. The print head 10 and carriage 11 are also accommodated inside the rectangular frame 16 so as to be capable of moving reciprocally left and right.

The rectangular frame 16 includes a rear plate 16a and a front plate 16b. A paper introducing opening and paper discharging opening (not shown) are formed in the rear plate 16a and front plate 16b, respectively. Paper supplied by the paper supplying unit 2 is introduced into the rectangular frame 16 via the paper introducing opening, conveyed to the front of the rectangular frame 16 by the paper conveying mechanism 14, and discharged through the paper discharging opening onto the discharge tray 5 (FIG. 1) on the front of the multifunction device 1. A black platen 17 having a plurality of ribs is mounted on the bottom surface of the rectangular frame 16. The print head 10 performs a printing operation on paper inside the rectangular frame 16 as the paper moves over the black platen 17.

The print head 10 is provided with four sets of ink nozzles 10a–10d that point downward. Paper is printed on by ejecting four colors (black, cyan, yellow, and magenta) of ink downward through these sets of ink nozzles 10a–10d. Since the four sets of ink nozzles 10a–10d are disposed on the bottom side of the print head 10, their positions are represented by broken lines in FIG. 2.

Ink cartridges 21a–21d for each of the four colors are mounted in a cartridge holder 20 on the front side of the rectangular frame 16. The ink cartridges 21a–21d are connected to the print head 10 via four flexible ink tubes 22a–22d that pass through the rectangular frame 16 in order to supply ink of each of the four colors to the print head 10.

Left and right flexible printed circuits (FPC) 23 and 24 are disposed inside the rectangular frame 16. The left FPC 23 extends together with the flexible ink tube 22a and flexible ink tube 22b and connects to the print head 10. The right FPC 24 extends together with the flexible ink tube 22c and flexible ink tube 22d and connects to the print head 10. The left FPC 23 and right FPC 24 include a plurality of signal lines that electrically connect the print head 10 to a control process unit 70 (shown in FIG. 3) described later.

The guide mechanism 12 has a guide shaft 25 and a guide rail 26. The guide shaft 25 extends left-to-right in the back part of the rectangular frame 16. The left and right ends of the guide shaft 25 are coupled with a left plate 16c and a right plate 16d, respectively, of the rectangular frame 16. The guide rail 26 extends left-to-right in the front part of the rectangular frame 16. The rear end of the carriage 11 is fitted over the guide shaft 25 so as to be capable of sliding along the same, while the front end of the carriage 11 is engaged with the guide rail 26 and capable of sliding along the same.

The carriage moving mechanism 13 includes a carriage motor 30, a drive pulley 31, a follow pulley 32, and a belt 33. The carriage motor 30 is mounted on the rectangular frame 16 at the rear side of the rear plate 16a on the right end and facing front. The drive pulley 31 is rotatably supported on the right end of the rear plate 16a and is driven to rotate by the carriage motor 30. The follow pulley 32 is rotatably supported on the left end of the rear plate 16a. The belt 33 is looped around the pulleys 31 and 32 and fixed to the carriage 11. A carriage conveyance encoder 39 is disposed near the carriage motor 30 for detecting movement (position) of the carriage 11 (print head 10).

The paper conveying mechanism 14 includes a paper conveying motor 40, a registration roller 41, a drive pulley 42, a follow pulley 43, and a belt 44. The paper conveying motor 40 is mounted facing leftward on the portion of the left plate 16c that protrudes further rearward than the rear plate 16a. The registration roller 41 extends in the left-to-right direction in the rectangular frame 16 below the guide shaft 25. The left and right ends of the registration roller 41 are rotatably supported in the left plate 16c and right plate 16d, respectively. The drive pulley 42 is driven to rotate by the paper conveying motor 40. The follow pulley 43 is coupled to the left end of the registration roller 41. The belt 44 is looped around the pulleys 42 and 43. When the paper conveying motor 40 is driven, the registration roller 41 rotates and conveys paper on the platen 17 in the rear-to-front direction. While the registration roller 41 is emphasized in FIG. 2, the registration roller 41 is actually disposed beneath the guide shaft 25.

The paper conveying mechanism 14 further includes a discharge roller 45, a follow pulley 46, a follow pulley 47, and a belt 48. The discharge roller 45 extends in the left-to-right direction in the front section of the rectangular frame 16. The left and right ends of the discharge roller 45 are rotatably supported in the left plate 1c and right plate 16d, respectively. The follow pulley 46 is integrally provided with the follow pulley 43. The follow pulley 47 is coupled to the left end of the discharge roller 45. The belt 48 is looped around the pulleys 46 and 47. When the paper conveying motor 40 is driven, the discharge roller 45 rotates and discharges paper toward the discharge tray 5 in the front of the multifunction device 1.

An encoder disk 51 is fixed to the follow pulley 43. A photo interrupter 52 having a light-emitting unit and a light-receiving unit is mounted on the left plate 16c such that the encoder disk 51 is interposed between the light-emitting unit and light-receiving unit. The encoder disk 51 and photo interrupter 52 together make up a paper conveyance encoder 50. The control process unit 70 described later controls the driving of the paper conveying motor 40 based on detection signals from the paper conveyance encoder 50 (more specifically, from the photo interrupter 52).

The maintenance mechanism 15 includes a wiper 15a, two caps 15b, and a drive motor 15c. The wiper 15a wipes the surface of the print head 10. Each of the caps 15b can hermetically seal two sets of the ink nozzles 10a–10d. The drive motor 15c drives both of the wiper 15a and caps 15b. The wiper 15a, caps 15b, and drive motor 15c are mounted on a mounting plate 15d. The mounting plate 15d is fixed to the lower surface side of the bottom plate of the rectangular frame 16 at its right portion. Since the caps 15b are disposed on the bottom side of the print head 10, dotted lines indicate the positions of the caps 15b on the opposite side in FIG. 2.

As shown in FIG. 2, a media sensor 68 is provided on the left end of the print head 10 as a downstream sensor for detecting the leading edge, trailing edge, and widthwise edges of the paper. The media sensor 68 is a reflection-type optical sensor that includes a light-emitting element 82 (light-emitting diode) having a light-emitting portion 82a and a light-receiving unit 83 (phototransistor) having a light-receiving portion 83a as shown in FIG. 4. The media sensor 68 is mounted face down on a sensor mounting unit 10e that protrudes to the left side of the print head 10. The media sensor 68 moves in the carriage-moving direction when the carriage 11 moves in the carriage-moving direction. When the media sensor 68 is located above an area inside the paper P, the media sensor 68 confronts the sheet of paper P. When the media sensor 68 is located above the area outside the paper P, the media sensor 68 confronts the platen 17.

In addition, a registration sensor 69 (see FIG. 3) is disposed upstream (rearward) of the media sensor 68 in the paper conveying direction as the upstream sensor for detecting the existence of paper and the leading edge and trailing edge of the paper. More specifically, the registration sensor 69 is mounted in the front end of a top cover (not shown) provided in the paper supplying unit 2 that forms a conveying path in the paper supplying unit 2.

The registration sensor 69 can be configured, for example, by a mechanical sensor having a probe, a photo interrupter, and a torsion spring. The probe protrudes into the paper conveying path and rotates when contacted by the paper. The photo interrupter includes a light-emitting unit and a light-receiving unit for detecting rotation of the probe. The torsion spring urges the probe into the paper conveying path. A shielding part is integrally provided on the probe. When the probe is rotated by contact from paper, the shielding part becomes positioned in regions outside the area between the light-emitting unit and the light-receiving unit of the photo interrupter. Therefore, when light is transmitted from the light-emitting unit to the light-receiving unit, the registration sensor 69 is in an ON state. Since the probe is urged into the paper conveying path by the torsion spring when paper is not being conveyed, the shielding part becomes positioned between the light-emitting unit and light-receiving unit of the photo interrupter at this time. Hence, the shielding part interrupts the transmission of light from the light-emitting unit to the light-receiving unit, placing the registration sensor 69 in an OFF state.

Next, the control process unit 70 will be described in greater detail. FIG. 3 is a block diagram showing the electric configuration of the control process unit 70.

As shown in FIG. 3, the control process unit 70 includes a microcomputer having a CPU 71, a ROM 72, a RAM 73, and an EEPROM 74. The registration sensor 69, media sensor 68, paper conveyance encoder 50, operating panel 6, carriage conveyance encoder 39, and the like are electrically connected to the control process unit 70.

Also electrically connected to the control process unit 70 are drive circuits 76*a*–76*c*, and a print head drive circuit 76*d*. The drive circuits 76*a*–76*c* drive the paper feed motor 65, the paper conveying motor 40, and the carriage motor 30, respectively. The print head drive circuit 76*d* drives the print head 10. The control process unit 70 is also capable of being connected to a personal computer 77.

Based on results from the media sensor 68 for detecting a paper P, the control process unit 70 outputs a carriage control command signal to the carriage moving mechanism 13 for moving the relative position of the carriage 11 with resepct to the paper P closer to a target relative position that is determined based on a printing content to be printed. The carriage moving mechanism 13 drives the carriage motor 30 based on the received carriage control command signals in order to move the carriage 11 reciprocally along the guide shaft 25 so that the relative position of the carriage 11 with respect to the paper P approach the target relative position.

Next, the structure of the media sensor 68 will be described in more detail. FIG. 4 is an explanatory diagram showing the cross-sectional structure of the media sensor 68 mounted on the print head 10 (carriage 11). The view of the media sensor 68 in FIG. 4 is from the rear side of the printer 3.

As shown in FIG. 4, the media sensor 68 includes: a main sensor unit 80 and a cap 85. The main sensor unit 80 is in a cylindrical shape, and has a light-emitting element 82, a light-receiving element 83, and a filling material 81. The cap 85 has a cylindrical shape that is capable of accommodating the main sensor unit 80. The main sensor unit 80 is mounted inside the cap 85. The cap 85 has a bottom wall portion 85*a*.

The light-emitting element 82 is substantially cylindrical in shape having a central axis 82*c* and having an outer diameter of 2.2 mm. The light-emitting element 82 has one axial end (the bottom end in FIG. 4) that is formed in a hemispherical shape. The light-emitting element 82 has an emission portion 82*a* on the hemispherical bottom end. The emission portion 82*a* is located substantially on the central axis 82*c*. The light-emitting element 82 has low directivity. That is, the emission portion 82*a* emits a detecting light in a broad angle. (The emission angle corresponds to the directivity.) The emission portion 82*a* emits a detecting light downwardly, that is, in a direction toward the platen 17 at the broad emitting angle. The light emitted from the emission portion 82*c* therefore travels in a direction along the central axis 82*c* toward the platen 17 while being spread with an amount of the emitting angle. When the sheet of paper P is located below the media sensor 68 and on the platen 17, the emission portion 82*a* emits a detecting light toward the paper P at the broad emitting angle. The light emitted from the emission portion 82*c* travels in a direction along the central axis 82*c* toward the paper P while being spread with an amount of the emitting angle.

The light-receiving element 83 is substantially cylindrical in shape having a central axis 83*c* and having an outer diameter of 2.2 mm. The light-receiving element 83 has one axial end (the bottom end in FIG. 4) that is formed in a hemispherical shape. The light-receiving element 83 has a light-receiving portion 83*a* on the hemispherical bottom end. The light-receiving portion 83*a* is located substantially on the central axis 83*c*. The light-receiving element 83 has low directivity. That is, the light-receiving portion 83*a* receives light over a broad angle. (The light-receiving angle corresponds to the directivity.) The light-receiving portion 83*a* receives external light over the broad light-receiving angle. When no paper P is located below the media sensor 68, the light-receiving portion 83*a* receives light that is reflected off the platen 17 and that travels and reaches the light-receiving portion 83*a* in a direction that is included within the light-receiving angle of the light-receiving element 83 around the central axis 83*c*. When the paper P is located below the media sensor 68, the light-receiving portion 83*a* receives light that is reflected off the paper P and that travels and reaches the light-receiving portion 83*a* in a direction that is included within the light-receiving angle of the light-receiving element 63 around the central axis 83*c*.

The light-emitting element 82 and light-receiving element 83 are disposed such that their central axes 82*c* and 83*c* are substantially parallel to each other and are substantially perpendicular to or normal to the upper surface (detecting surface) of the platen 17. When the paper P is located on the platen 17, the central axes 82*c* and 83*c* are substantially perpendicular to or normal to the upper surface (detecting surface) of the paper P.

In this example, the filling material 81 is made of resin that has light-shielding property, and has an end surface 81*a* at its bottom portion. For example, the filling material 81 is made of color resin. The light-emitting element 82 and light-receiving element 83 are supported by the filling material 81 with the centers of the emission portion 82*a* and the light-receiving portion 83*a* being exposed on the end surface 81*a*. The emission portion 82*a* and light-receiving portion 83a are disposed in the cap 85 with their centers being positioned on the end surface 81a with a gap of 2.8 mm therebetween.

As mentioned above, the cap 85 has the bottom wall portion 85a. In addition, a common opening 85b is formed through the bottom wall portion 85a to allow the passage of detecting light and reflected light. The bottom wall portion 85a is formed so as to reduce the area of overlap between the area on the platen 17 (or the paper P) on which detecting light from the light-emitting portion 82a is irradiated and the area on the platen 17 (or the paper P) from which reflected light can be received by the light-receiving portion 83a. The common opening 85b is circular in shape having an inner diameter Xc of 3.0 mm. The bottom wall portion 85a has a thickness Xd of 1.0 mm. An interior gap Xa between an inner surface of the bottom wall portion 85a and the end surface 81a of the fillter material 81 (the light-emitting portion 82a and the light-receiving portion 83a) is set to 5.0 mm. In other words, the gap between the inner surface of the bottom wall portion 85a and the light-emitting portion 82a, and the gap between the inner surface of the bottom wall portion 85a and the light-receiving portion 83a are equal to each other and are set to 5.0 mm.

The media sensor 68 is mounted on the sensor mounting unit 10e of the print head 10. An outer gap Xb from the outer surface of the bottom wall portion 85a to an imaginary plane, on which the platen 17 and the sheet of paper P are located, is 5.0 mm. The media sensor 68 is mounted on the sensor mounting unit 10e such that the center of the common opening 85b is aligned with an imaginary line 85c that is perpendicular to or normal to the surface of the platen 17 (the surface of the paper P) and that extends from the approximate center of a line segment L0 that connects the center of the emission portion 82a to the center of the light-receiving portion 83a.

Next, the size of the region in which an object is detectable (target detection area) by the media sensor 68 will be described with reference to FIGS. 5(a) and 5(b). The description will show the difference in the size of this target detection area when the main sensor unit 80 is combined with the cap 85 into the media sensor 68, and when the main sensor unit 80 is not covered by the cap 85.

FIG. 5(a) is an explanatory diagram illustrating a target detection area S1 of the media sensor 68 (combination of the main sensor unit 80 and the cap 85). FIG. 5(b) is an explanatory diagram illustrating a target detection area S2 of the main sensor unit 80, per se.

As shown in FIG. 5(b), in the standalone main sensor unit 80, the target detection area S2 is defined as a region in which an irradiation area S2a of detecting light irradiated by the light-emitting element 82 overlaps a light-receiving area S2b from which reflected light can be received by the light-receiving element 83. The irradiation area S2a is determined dependently on the directivity (emission angle) of the light-emitting element 82, while the light-receiving area S2b is determined dependently on the directivity (light-receiving angle) of the light-receiving element 83. The target detection area S2, the irradiation area S2a, and the light-receiving area S2b are defined on the imaginary plane, on which the sheet of paper P and the platen 17 are located.

As shown in FIG. 5(a), the target detection area S1 is defined as an area in which an irradiation area S1a of detecting light that is irradiated by the light-emitting element 82 and that is restricted by the common opening 85b overlaps a light-receiving area S1b from which reflected light regulated by the common opening 85b can be received by the light-receiving element 83. The target detection area, S1, the irradiation area S1a, and the light-receiving area S1b are defined on the imaginary plane, on which the sheet of paper P and the platen 17 are located.

Since the media sensor 68 is provided with the cap 85 for covering the emission portion 82a and light-receiving portion B3a, the angular range of light emitted from the light-emitting element 82 and the angular range of light that can be received by the light-receiving element 83 is restricted. As a result, the target detection area S1 of the media sensor 68 is smaller than the target detection area S2 of the main sensor unit 80.

When an intended area of detection (desired detection area) is small, the larger the target detection area of the sensor, the more the sensor is susceptible to the influence of disturbance outside the desired detection area and, thus, the greater the detection error and the less the detection accuracy. When detecting the edge of the paper P, the desired detection area is a boundary line between the paper P and the area outside the paper P (black platen 17), which is an extremely small area.

As illustrated in FIGS. 5(a) and 5(b), the media sensor 68 can reduce the target detection area S1 to an area smaller than that of the target detection area S2 of the standalone main sensor unit 80. Therefore, the media sensor 68 can prevent a decline in detection accuracy for the application of detecting the edge of the paper P.

Further, the media sensor 68 is mounted on the sensor mounting unit 10e of the print head 10 such that the light-emitting element 62 and light-receiving element 83 are aligned with the scanning direction (direction of movement) of the carriage 11.

Next, the shape of the target detection area S1 will be described in more detail with reference to FIGS. 6(a)–6(c).

Figure 6A:
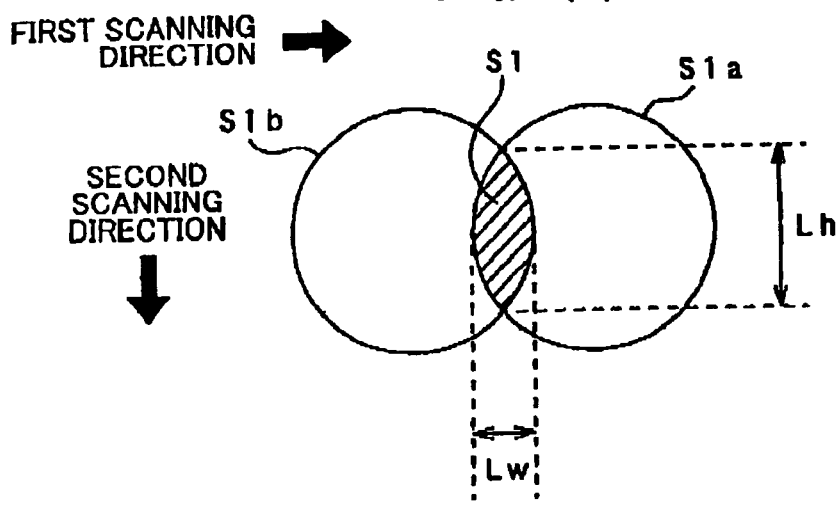
FIG. 6(a) is an explanatory diagram showing a target detection area of the media sensor when the light-emitting element and light-receiving element are aligned with a first scanning direction.

FIG. 6(a) shows the target detection area S1 of the media sensor 68, along with the irradiation area S1a for detecting light emitted by the light-emitting element 82 and the light-receiving area S1b of the light-receiving element 83. The light-emitting element 82 and the light-receiving element 83 are aligned with a first scanning direction in FIG. 6(a). The target detection area S1 is substantially elliptical in shape having a size (width) Lw in the direction (left-to-right in the drawing), in which the light-emitting element 82 and the light-receiving element 83 are aligned, and another size (length) Lh in another direction (top-to-bottom in the drawing) that is perpendicular to the direction, in which the light-emitting element 82 and the light-receiving element 83 are aligned. The width Lw is shorter than the length Lh. In other words, the target detection area 51 has the width Lw in the first scanning direction and the length Lh in a second scanning direction that is perpendicular to the first scanning direction.

Figure 6B:
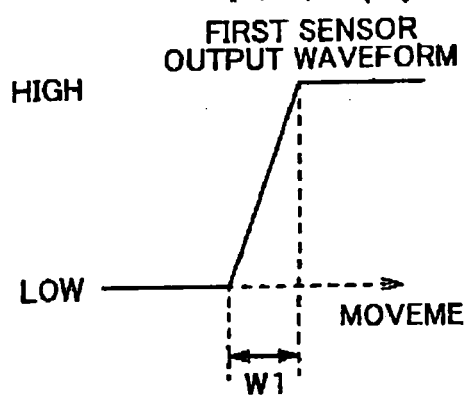
FIG. 6(b) is a graph showing the waveform of sensor output for paper edge detection when the media sensor is moved in the first scanning direction that is equivalent to the direction in which the light-emitting element and light-receiving element are aligned.
Figure 6C:
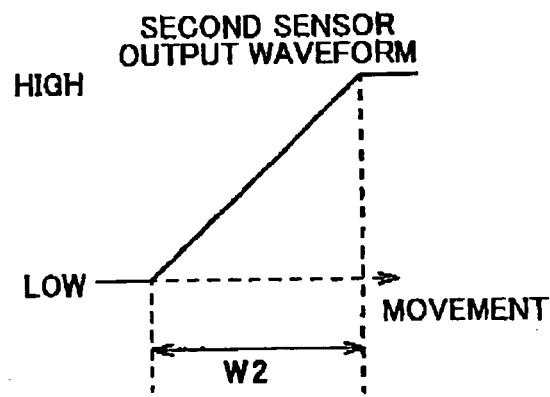
FIG. 6(c) is a graph showing the waveform of sensor output for paper edge detection when the media sensor is moved in a second direction that is perpendicular to the direction in which the light-emitting element and light-receiving element are aligned.

FIG. 6(b) is a graph showing the waveform (first sensor output waveform) of sensor output (output of the light-receiving element 83) for detecting the edge of the paper P when the media sensor 68 is moved along the first scanning direction (FIG. 6(a)) in which the light-emitting element 82 and light-receiving element 83 are disposed. FIG. 6(c) is a graph showing the waveform (second sensor output waveform) of sensor output (output of the light-receiving element 83) for detecting the edge of the paper P when the media sensor 68 is moved in the second scanning direction (FIG. 6(a)) that is perpendicular to the first scanning direction in which the light-emitting element 82 and light-receiving element 83 are disposed. In the graphs of both of FIG. 6(b) and FIG. 6(c), the vertical axis indicates the value for sensor output (voltage), while the horizontal axis represents the amount of movement of the media sensor 68.

The media sensor 68 has a characteristic that the output value of the sensor (voltage) grows larger as the color of the object in the target detection area S1 approaches white and grows smaller as the color of the object approaches black. Accordingly, the output of the media sensor 68 switches to HIGH level when the paper P is located on the target detection area S1 and LOW level when the paper P is not located on the target detection area S1 but the black platen 17 is located on the target detection area S1. In other words, the output of the media sensor 68 switches to HIGH level when the paper p is detected and LOW level when the paper P is not detected but the black platen 17 is detected. However, when both the paper P and the black platen 17 are present in the target detection area S1, the sensor output value varies according to the percentage of area occupied by each.

As the width of the interval (distance) in which the sensor output varies between LOW level and HIGH level increases, the sensor response becomes slower and the error for paper edge detection increases.

As shown in FIGS. 6(*b*) and 6(*c*), an output variation interval W1 for the first sensor output waveform is smaller than an output variation interval W2 for the second sensor output waveform. Hence, when detecting an edge of the paper P using the media sensor 68, detection errors can be suppressed by moving the media sensor 68 in the first scanning direction, in which the light-emitting element 82 and the light-receiving element 83 are aligned, and not in the second scanning direction.

In the preferred embodiment, in order to dectect the left and right edges of the paper P, the light-emitting element 82 and the light-receiving element 83 of the media sensor 68 are aligned with the scanning direction of the carriage 11. That is, the light-emitting element 82 and the light-receiving element 83 are aligned with the carriage-scanning direction (first scanning direction of FIG. 6(*a*)), and are scanned in the carriage-scanning direction (first scanning direction of FIG. 6(*a*)). This arrangement reduces detection errors by decreasing the width of the output variation interval as shown in FIG. 6(*b*).

It is noted that if the media sensor 68 having the light-emitting element 82 and the light-receiving element 83 arranged in the first scanning direction (carriage moving direction) were used to detect the leading and trailing edges of the paper P, which is conveyed in the second scanning direction, the width of the output variation interval will increase as shown in FIG. 6(*c*), thereby increasing the detection error. Accordingly, if it is desired to detect the leading and trailing edges of the paper P by the media sensor 68 with high accuracy, the light-emitting element 82 and light-receiving element 83 should be aligned with the sheet conveying direction (second scanning direction) as shown in FIG. 6(*d*).

Figure 7:
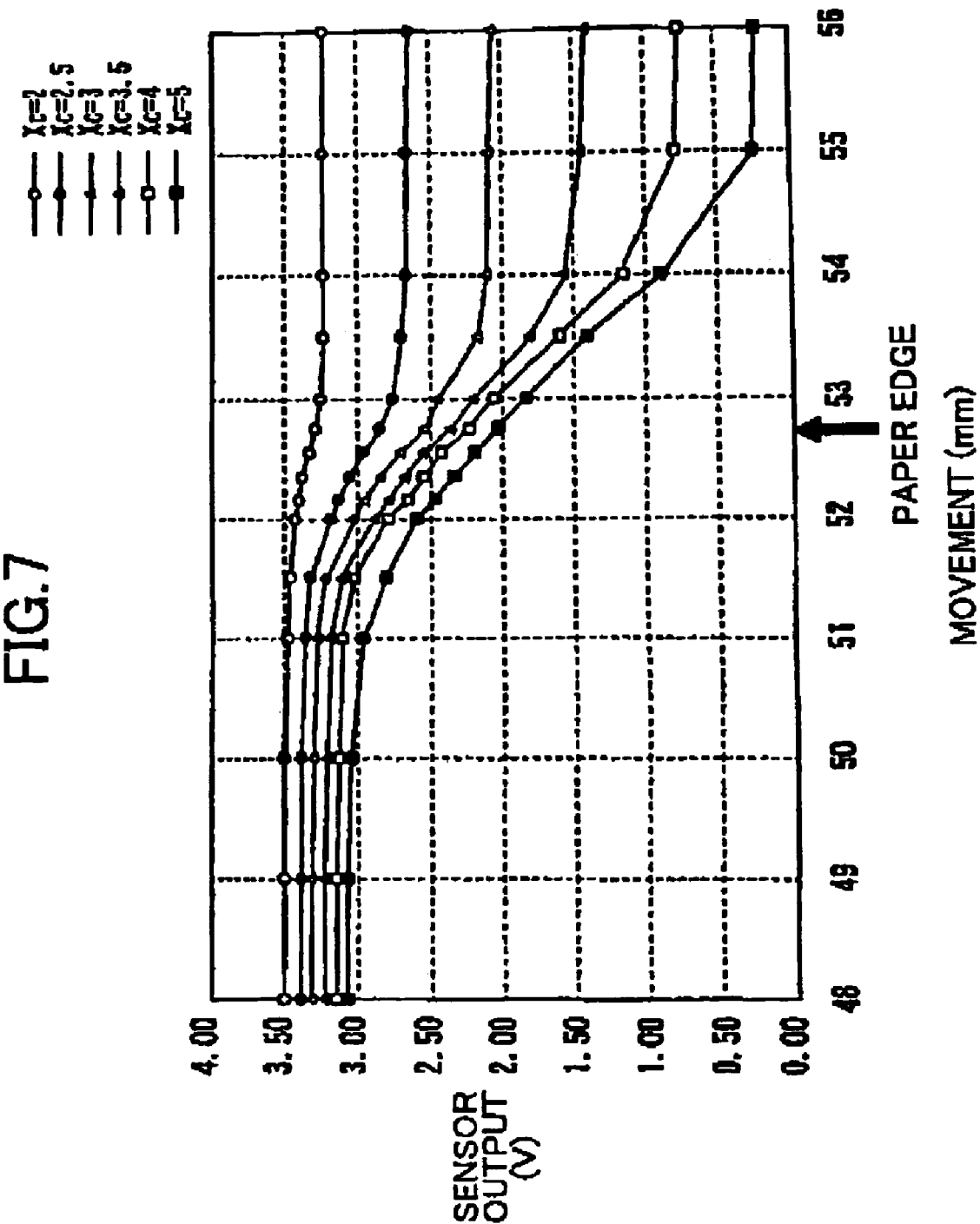
FIG. 7 is a graph showing values of sensor output that were measured while the inner diameter of an opening formed in the cap member was varied.

The present inventor measured sensor output while varying the inner diameter Xc of the common opening 85*b* (FIG. 4). The results of these measurements will be described using the graph of waveforms shown in FIG. 7. In FIG. 7, the horizontal axis represents the amount of movement (mm) of the media sensor 68, while the vertical axis represents the sensor output (V).

Measurements were conducted using six types of caps 85 with varying inner diameters Xc: 2.0 mm, 2.5 mm, 3.0 mm, 3.5 mm, 4.0 mm, and 5.0 mm. It is noted that the outer diameters of the light-emitting element 82 and the light-receiving element 83 were each set to 2.2 mm; the distance between the centers of the light-emitting portion and the light-receiving portion was 2.8 mm; the thickness Xd of the wall portion 85*d* was 11.0 mm; the distances Xa from the light-emitting portion 82 and from the light-receiving portion 83 to the wall portion 85*a* each 5.0 mm; and the distance Xb from the wall portion 85*a* to the sheet of paper P and to the platen 17 was 5.0 mm. The inventor disposed the media sensor 68 in a region that is outside the paper P and is away from the edge of the paper P by 52.8 mm. The inventor then conducted measurements by moving the media sensor 68 from the area outside the paper P (black platen 17) to the paper P, while recording sensor output. It is noted that the light-emitting element 82 and light-receiving element 83 were aligned with the moving direction of the media sensor 68. In FIG. 7, the position at which the movement is 52.8 mm, indicated by the arrow, is the actual position of the edge of the paper P.

Based on the waveforms of measured values in FIG. 7, the width of the interval in which the sensor output changes from HIGH level to LOW level increases as the inner diameter Xc increases. As described above, when the width of the output variation interval increases, sensor response slows, increasing the error in paper edge detection. Hence, it is known that a smaller value of inner diameter Xc is preferable. By setting the inner diameter Xc to 3.5 mm or less, for example, the output variation interval can be restricted to 2 mm or less. At this level, detection errors can be decreased sufficiently to avoid problems in use in the printer 3, thereby preventing a drop in detection precision.

On the other hand, as the inner diameter Xc is set smaller, the difference between the sensor output at HIGH level and LOW level also grows smaller. Therefore, it may be impossible to detect variations in the sensor output if the inner diameter Xc is set too small. The inner diameter Xc must be set large enough to differentiate between the sensor output at HIGH level and LOW level.

For example, when the inner diameter Xc is set to 2.5 mm or greater, a difference in sensor output at HIGH level and LOW level of 0.5 V or greater can be achieved, enabling easy detection of a change in level of sensor output. In this way, a sufficiently large variation in sensor output can be attained without causing problems in using the printer 3, thereby preventing a drop in detection precision.

Based on the results of these measurements, the media sensor 68 will have sufficient detection precision by forming the common opening 85*b* with an inner diameter Xc within a range of 2.5 to 3.5 mm. Since the inner diameter Xc in the preferred embodiment is 3.0 mm, the media sensor 68 has sufficient detection accuracy, and the printer 3 can accurately detect the edge of the paper P.

It is confirmed by the measurement results that by setting the inner diameter Xc within the range 2.5–3.5 mm, the area of variation in sensor output signals (voltage) at the border area between the paper P and the region outside the paper P can be decreased and at the same time, the difference in sensor output signal levels (HIGH level and LOW level) at the paper P and the region outside the paper P can be set large enough that the two are distinguishable. It is noted that the area of sensor output signal variation is the output variation interval in which sensor output varies between LOW level and HIGH level. By decreasing this area of sensor output signal variation, it is possible to distinguish the paper P from the area outside the paper P in finer units of measurement, thereby achieving a high-performance sensor with minimum detectable units of measurement. Since the paper P can easily be differentiated by setting the difference in sensor output signal level for the paper P and the area outside the paper P large enough to be distinguishable, the present embodiment can prevent a decline in detection accuracy. Accordingly, this reflection-type optical sensor 68 can reduce the minimum detectable units of measurement and can achieve a high performance capable of suppressing a drop in detection accuracy.

As described above, the media sensor 68 provided in the multifunction device 1 (more specifically the printer 3) of the preferred embodiment includes the cap 85 having the common opening 85*b*. The cap 85 can restrict the angular range of light emitted from the light-emitting element 82 and the angular range of light receivable by the light-receiving element 83 and can suppress the effects of external disturbance. Hence, even when employing inexpensive elements with low directivity as the light-emitting element 82 and light-receiving element 83, it is possible to prevent a drop in detection accuracy for applications having a narrow desired detection area. Further, since the bottom wall portion 85*a* is designed to reduce the overlapping area on the paper P between the irradiation area of detecting light and the area of light that can be received by the light-receiving element 83, variations in the amount of reflected light in the target detection area can be satisfactorily detected. Since light-emitting and light-receiving elements with low directivity are less expensive than those with high directivity, the reflection-type optical sensor 66 of the present embodiment can be manufactured at a cost less than media sensors equipped with elements having high directivity.

In the media sensor 66 of the preferred embodiment, the light-emitting element 82 and light-receiving element 83 are disposed with their central axes 82*c* and 83*c* extending parallel with each other and in a direction perpendicular to the surface of the paper P (the detecting surface) and not in a direction slanted in relation to the paper P (object of detection). This configuration reduces the amount of variation in the angle of reflected light caused by changes in the angle of detecting light incident on the paper P in comparison to sensors having elements disposed at a slant to the paper P. Hence, the present embodiment can suppress a decline in detection accuracy caused by error in the angle at which the light-emitting element and light-receiving element are disposed, and error in the angle at which the media sensor 68 is disposed.

By disposing the light-emitting element 82 and the light-receiving element 83 with their central axes 82*c*, 83*c* extending parallel to each another, the area in which the elements 82 and 83 are disposed in the media sensor 68 can be made smaller than when the elements are arranged at a slant.

Accordingly, the media sensor 68 of the preferred embodiment can prevent reductions in detection accuracy caused by errors in positioning angles and can keep costs low. The media sensor 68 can also prevent a decline in detection accuracy caused by external disturbance and can be produced at an even smaller size.

Further, by disposing the light-emitting element 82 and the light-receiving element 83 with their central axes 82*c*, 83*c* extending parallel to each other, the distance of the paths along which the detecting light and reflected light travel can be made shorter than when disposing the elements at a slant, thereby reducing the degree at which the reflected light attenuates on the traveling path prior to reaching the light-receiving element 83. Hence, even the light-receiving element 83 with low directivity can satisfactorily receive reflected light, while preventing a decline in accuracy for detecting the paper P.

The media sensor 68 is configured by disposing the light-emitting element 82 and the light-receiving element 83 such that the distance from the emission portion 82*a* to the common opening 85*b* is approximately equal to the distance from the light-receiving portion 83*a* to the common opening 85*b*. This configuration prevents the light-emitting element 82 and the light-receiving element 83 from obstructing the passage of detecting light and reflected light. If the distance from the emission portion 82*a* to the common opening 85*b* were different from the distance from the light-receiving portion 83*a* to the common opening 85*b*, either the light-receiving element 83 will be disposed on the propagating path of the detecting light and will block the passage of detecting light, or the light-emitting element 82 will be disposed on the propagating path of the reflected light and will block the passage of reflected light. In contrast, according to the present embodiment, when the distance from the emission portion 82*a* to the common opening 85*b* is substantially equal to the distance from the light-receiving portion 83*a* to the common opening 85*b*, the light-receiving element 83 is not at a position blocking the passage of detecting light and the light-emitting element 82 is not at a position blocking the passage of reflected light because the light-emitting element 82 and light-receiving element 83 are juxtaposed. Therefore, the media sensor 68 enables the light-receiving element 83 to continuously receive reflected light, thereby preventing a decline in detection accuracy.

The media sensor 68 is also configured such that the center of the common opening 85*b* is disposed along the imaginary line 85*c* that extends perpendicular to the surface of the paper P and that extends from the approximate center of the line segment L0 that connects the emission portion 82*a* and the light-receiving portion 83*a*.

Accordingly, the shortest path from the light-emitting element 82 to the light-receiving element 83 via the paper P (in other words, among the propagating paths of detecting light and reflected light) falls within the target detection area S1. When the propagating paths are shortest, it is possible to minimize attenuation of the detecting light and reflected light, thereby suppressing the reduction in the amount of the reflected light received by the light-receiving element 83.

The carriage 11 is capable of moving along the guide shaft 25 above the paper P in order to detect the position of the paper P (specifically the edges of the paper P). The carriage 11 includes the media sensor 68 on the print head 10 for detecting the paper e. As described above, the media sensor 68 is a small inexpensive sensor with excellent detecting accuracy. Hence, by using the media sensor 68 to detect the position of the paper P, this carriage 11 can suppress such adverse effects as error in the angle at which the media sensor 68 is disposed and can improve the accuracy in detecting the position of the paper P. Since the media sensor 68 is also inexpensive to produce, the cost of the carriage 11 can also be reduced. Further, since the media sensor 68 is compact, the overall size of the carriage 11 can also be made smaller. Accordingly, the carriage 11 can detect the position of the paper P with good accuracy and can be made small and at a low cost, making the carriage 11 suitable for a wider range of applications.

The printer 3 of the preferred embodiment is a printing device for printing text and graphics on a paper P. During the printing process, the carriage moving mechanism 13 receives commands from the control process unit 70 based on detection results from the media sensor 68 in detecting the edges of the paper P and moves the carriage 11 and print head 10 based on these commands, while the paper conveying mechanism 14 conveys the paper P.

As described above, the media sensor 68 suppresses such adverse effects as error in the angle at which the media sensor 68 is disposed and outside disturbance, thereby improving the accuracy in detecting edges of the paper P.

Accordingly, the printer 3 can determine the position of the print head 10 in relation to the paper P with improved accuracy based on the detections by the media sensor 68 and, hence, can determine the position at which the printing process is performed on the paper P with accuracy. Further, since the media sensor 68 can be manufactured in a compact size and at a low cost, the cost and size of the overall printer 3 can also be reduced.

The printer 3 can perform a printing process on the paper P with good accuracy, and the size and cost of the printer 3 can be reduced, thereby achieving a data processing apparatus that can be used for a broader range of applications.

The media sensor 68 is disposed in the printer 3 such that the outer gap Xb from the common opening 85b (specifically the outer surface of the bottom wall portion 85a) to the paper P is approximately equal to the interior gap Xa from the emission portion 82a and light-receiving portion 83a to the common opening 85b (specifically the inner surface of the bottom portion 85a). In this way, the angle at which detecting light and reflected light can propagate can be set to a suitable range, and the target detection area S1 of the media sensor 68 can be set to a suitable size. In contrast, if the distance from the common opening 85b to the paper P is excessively shorter or longer than the distance from the emission portion 82a and light-receiving portion 83a to the common opening 85b, then the angle at which the detecting light and reflected light can propagate may be set to an inappropriate range that could make the target detection area S1 too small or too large.

Since the target detection area S1 can be set to an appropriate size, the printer 3 can improve accuracy in detecting the paper P and can improve the accuracy of the data control process for the paper P.

Since the media sensor 68 is disposed in the printer 3 such that the light-emitting element 82 and light-receiving element 83 are aligned with the direction in which the carriage 11 moves reciprocally, the portion of the target detection area S1 through which the paper P passes is shortened, thereby decreasing the effective target detection area S1 (width along the detecting direction). Hence, the printer 3 can suppress the effects of disturbance and can lower detection error. In this embodiment, since the direction in which the carriage 11 moves is the same as the widthwise direction of the paper P, the printer 3 can improve the accuracy for detecting both ends of the paper P in the widthwise direction.

As described above, according to the present embodiment, the media sensor 68 includes the cap 85, with the common opening 85b for restricting the beam spread of light emitted from the light-emitting element 82 and the range of light receivable by the light-receiving element 83, while suppressing the effects of disturbance. Accordingly, the media sensor 68 can prevent a decline in detection accuracy while using inexpensive elements with low directivity. Since the light-emitting element 82 and light-receiving element 83 are oriented perpendicularly to the paper P, the media sensor 68 is superior to sensors equipped with elements disposed at an angle to the paper P by avoiding a decline in detection accuracy caused by errors in the angular positioning of the elements, errors in angular positioning of the sensor itself, and the like, and by reducing the space required in the sensor to dispose the elements, thereby reducing the size of the sensor.

<Modifications>

Figure 6D:
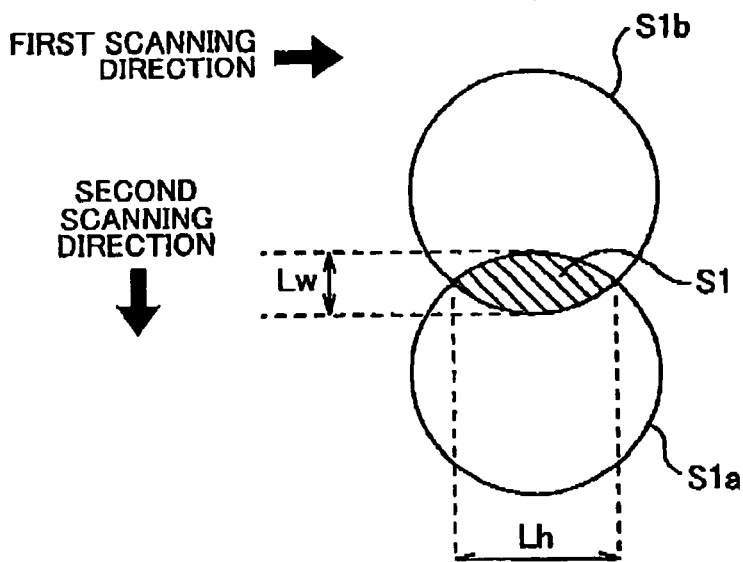
FIG. 6(d) is an explanatory diagram showing a target detection area of the media sensor when the light-emitting element and light-receiving element are aligned with the second scanning direction.

The above-description is for the case where it is desired to improve the precision for detecting the left and right edges of the sheet of paper P. However, when it is desired to improve the precision for detecting the leading edge of the sheet of paper P more than the precision for detecting the left and right edges of the sheet of paper P, the media sensor 68 is provided on the print head 10 such that the light-emitting element 82 and light-receiving element 83 are aligned in a direction perpendicular to the moving direction of the carriage 11. In other words, the light-emitting element 82 and light-receiving element 83 are aligned in the direction in which the paper P is conveyed by the paper conveying mechanism 14. In other words, the light-emitting element 82 and light-receiving element 83 are aligned with the second scanning direction as shown in FIG. 6(d). Accordingly, the width Lw of the effective target detection area S1 of the media sensor 68 in the detecting direction is small relative to the length Lh. Thus, the light-emitting element 82 and light-receiving element 83 are arranged to shorten the dimension of the paper P passing through the target detection area S1.

Hence, the printer 3 can reduce the effective target detection area S1 of the media sensor 68 and suppress the effects of disturbance, thereby reducing detection error. The carriage 11 is moved in the same direction as the widthwise direction of the paper P. It is possible to improve the accuracy in detecting edges of the paper P on the lengthwise ends (leading edge and trailing edge).

To improve the precision for detecting both left and right edges and leading and trailing edges of the paper P, it is preferable to provide the print head 10 with two media sensors 66, each having its light-emitting and light-receiving elements aligned in the appropriate direction for improving the detection accuracy for each edge. That is, one of the two media sensors 68 is disposed with its light-emitting and light-receiving elements 82 and 83 being aligned as shown in FIG. 6(a) in the carriage conveying direction (first scanning direction) that is perpendicular to the sheet conveying direction (second scanning direction) This improves the detection accuracy for left and right edges of each edge. The other media sensor 68 is disposed with its light-emitting and light-receiving elements 82 and 83 being aligned as shown in FIG. 6(d) in the sheet conveying direction (second scanning direction). This improves the detection accuracy for leading and trailing edges of each edge.

In such a case, the media sensors 68 can detect the leading edge of the paper P in the direction that the paper P is conveyed by the paper conveying mechanism 14 and the left and right edges of the paper P. By detecting the leading edge and the left and right edges of the paper P with the media sensors 68, the printer 3 can suitably detect the size of the paper P. The printer 3 can also appropriately detect the current position of the paper P based on the detected position of the leading edge of the paper P detected by the media sensor 68 and the amount that the paper P is conveyed by the paper conveying mechanism 14. By appropriately determining the size and position of the paper P, the printer 3 can accurately set the position for performing a printing process on the paper P and can print on the paper P with accuracy.

The media sensor is not limited to one having a single opening formed in the bottom portion of the cap, but can be provided with a cap having a plurality of openings.

Figure 8:
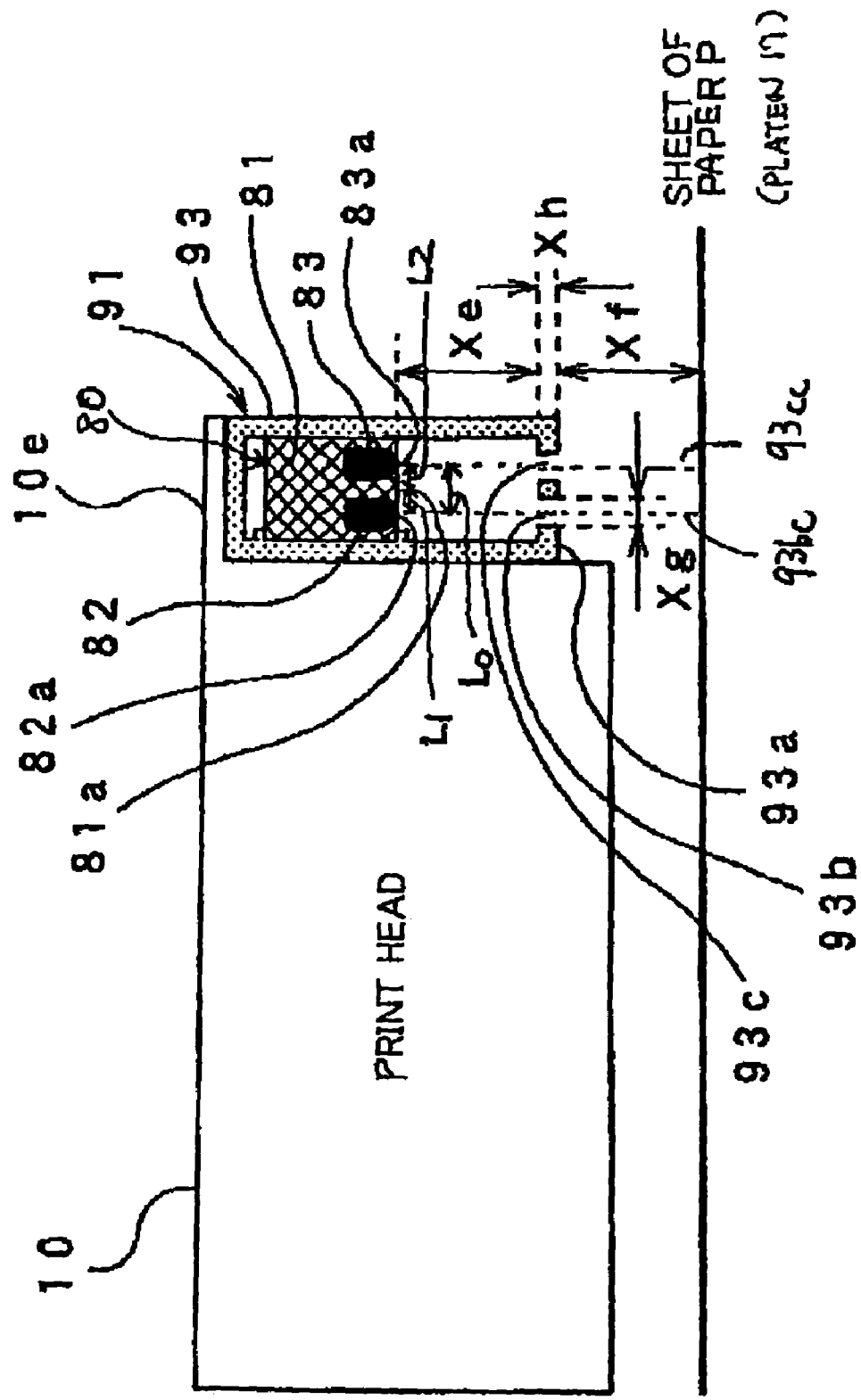
FIG. 8 is an explanatory diagram showing the cross-sectional structure of a modification of the media sensor that is provided with a modification of the cap member that has two openings.

FIG. 8 is an explanatory diagram illustrating the cross-sectional structure of a modification of the media sensor 68 (which will be referred to as a second media sensor 91 hereinafter). The second media sensor 91 is provided with a cap 93 (which will be referred to as a second cap 93 hereinafter) having two openings.

The second media sensor 91 is the same as the media sensor 68 of the above-described embodiment except that the second cap 93 is used in place of the cap 85.

The second cap 93 is cylindrical in shape and has a bottom wall portion 93a. The second cap 93 is capable of accommodating the main sensor unit 80. The main sensor unit 80 is mounted in the second cap 93. An emission opening 93b for allowing the passage of detecting light and a reception opening 93c for allowing the passage of reflected light are formed through the bottom wall portion 93a. Each of the emission opening 93b and the reception opening 93c is circular in shape and has an inner diameter Xg of 2.0 mm.

Since the light-emitting element 82 has high directivity near the center of the element, the brightness near the center is high. Similarly, since the light-receiving element 83 has high directivity near the center of the element, the light receiving sensitivity near the center is high. Accordingly, the media sensor 91 having the second cap 93 with openings 93b, 93c of inner diameters Xg approximately 2.0 mm can obtain the same output as the media sensor 68 having the cap 85.

The second cap 93 is configured such that a thickness Xh of the bottom wall portion 93a is 1.0 mm and the interior distance Xe from the inner surface of the bottom wall portion 93a to the end surface 81a of the main sensor unit 80 (filler material 81) is 5.0 mm.

The second media sensor 91 is mounted on the sensor mounting unit 10e so that an outer distance Xf from the outer surface of the bottom wall portion 93a to the platen 17 and the paper P is 5.0 mm.

The center of the emission opening 93b falls on an imaginary line 93bc that is perpendicular to the surface of the paper P and that extends from some point in a first line segment L1. The first line segment L1 extends from the center point of the emission portion 82a to the center point of the line segment L0 that connects the center of the emission portion 82a and the center of the light-receiving portion 83a.

Similarly, the center of the reception opening 93c is positioned on another imaginary line 93c that is perpendicular to the surface of the paper P and that extends from some point in a second line segment L2. The second line segment L2 extends from the center point of the light-receiving portion 83a to the center point of the line segment L0.

Figure 9:
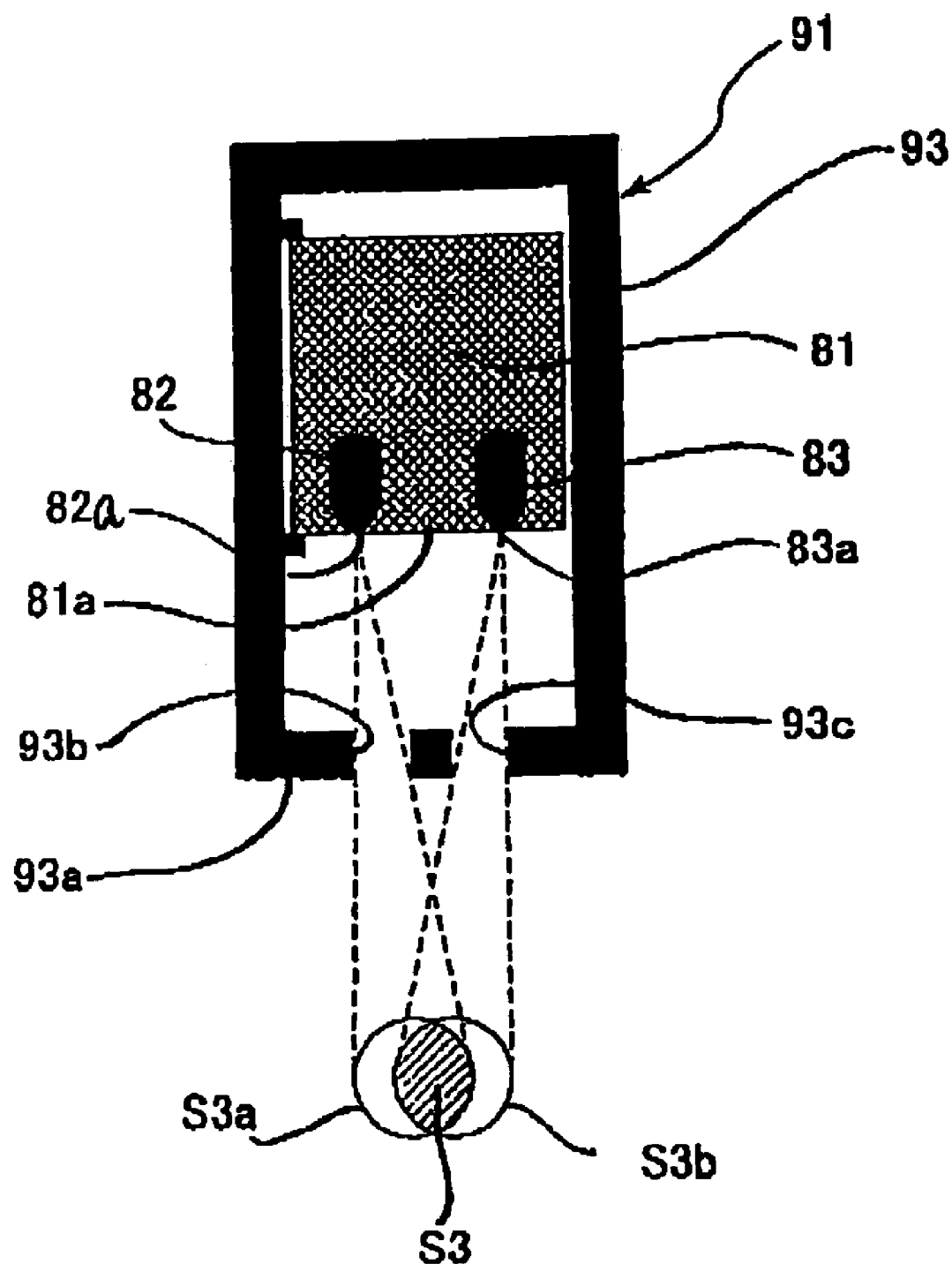
FIG. 9 is an explanatory diagram showing a target detection area of the media sensor of FIG. 8.

FIG. 9 is an explanatory diagram illustrating a target detection area S3 of the second media sensor 91. The target detection area S3 is the area in which an irradiation area s3a of detecting light irradiated by the light-emitting element 82 and restricted by the emission opening 93b overlaps a light-receiving area S3b from which reflected light regulated by the reception opening 93c can be received by the light-receiving element 83. The target detection area S3, the irradiation area S3a, and the light-receiving area S3b are defined on the imaginary plane, on which the sheet of paper P and the platen 17 are located.

The second media sensor 91 is provided with the openings 93b and 93c, which correspond to the elements 82 and 83, respectively. By varying the size of the openings 93b and 93c according to the application of the sensor 91 and the measuring environment, it is possible to regulate independently the amount of detecting light that passes through the opening 93b and the amount of reflected light that passes through the opening 93c. Therefore, the second media sensor 91 can improve detecting precision by making it possible to set appropriate values for the amount of detecting light that passes through the opening 93b and for the amount of reflected light that passes through the opening 93c individually.

While the invention has been described in detail with reference to the specific embodiment thereof, it would be apparent to those skilled in the art that many modifications and variations may be made therein without departing from the spirit of the invention, the scope of which is defined by the attached claims.

The applications of the media sensor 68 are not limited to printers, but also to other various data processing devices including copiers, scanners, and facsimile devices. In these devices, detection accuracy can be improved for detecting the paper size of an original being scanned. For example, a scanning mechanism for scanning the original to acquire data of text, graphics, images, and the like from the original P is mounted on the carriage 11. The scanning mechanism therefore moves together with the carriage 11 and performs a data acquiring process. Both of the scanning mechanism and the print head may be mounted on the carriage 11.

Further, the outer diameters of the light-emitting and light-receiving elements 82, 83 are not limited to 2.2 mm, but can still improve detection accuracy when they are set within a range of 2.0 to 2.4 mm.

In the embodiment described above, the media sensor 68 is mounted on the print head 10, but the media sensor 68 can also be directly mounted on the carriage 11.

Further, the carriage 11 is not limited to a construction for supporting the print head 10, but the print head 10 and the carriage 11 can also be formed integrally. Because the media sensor 68 has the cap 85, it is possible to prevent the light-emitting element 82 and light-receiving element 83 from becoming soiled by the spray of ink droplets or mist, thereby preventing a decline in accuracy caused by adhering ink droplets and the like. Further, the cap 85 can suppress a decline in detection accuracy caused by the effects of disturbance light from outside the paper P.

In the above description, the light-emitting element 82 and the light-receiving element 83 are disposed so that the distance from the light-emitting portion 82a to the wall portion 85a is approximately equal to the distance from the light-receiving portion 83a to the wall portion 85a. However, the distance from the light-emitting portion 82a to the wall portion 85a may be different from the distance from the light-receiving portion 83a to the wall portion 85a. In such a case, a distance from the opening 85b to the paper P may be substantially equal to either one of the distance from the light-emitting portion 82a to the wall portion 85a and a distance from the light-receiving portion 83a to the wall portion 85a.

What is claimed is:

1. A reflection-type optical sensor for detecting an object, the sensor comprising:
a light-emitting element having a central axis extending in a predetermined direction that extends substantially normal to a surface of an object to be detected and having a light-emitting portion that emits a detecting light onto the surface of the object, the detecting light traveling toward the surface of the object to define an irradiated region on the object;
a light-receiving element having a central axis extending parallel with the central axis of the light-emitting element and having a light-receiving portion that receives a reflected light that has reflected off a detecting region on the object, the detecting region and the irradiated region overlapping at an overlapping region on the surface of the object, the irradiated region having a remaining irradiated region other than the overlapping region of the irradiated region, the detecting region having a remaining detecting region other than the overlapping region of the detecting region; and
a restricting member having a restricting portion defining an opening that allows a part of the detecting light and a part of the reflected light to pass therethrough, the restricting portion restricting a size of the opening to reduce an area of the overlapping region on the surface of the object, the irradiated region corresponding to an area on the object that is projected by the detecting light through the opening, the detecting light reflected from the irradiated region having an overlapping light that is reflected from the overlapping region of the irradiated region and a remaining detecting light that is reflected from the remaining irradiated region, the light receiving portion receiving through the opening the overlapping light that is reflected from the overlapping region, and the restricting portion preventing the remaining detecting light from reaching the light receiving portion.

2. A reflection-type optical sensor according to claim 1, wherein the light-emitting element has a light-emitting end that confronts the object and that is located on the central axis of the light-emitting element, the light-emitting portion being located on the light-emitting end and having a predetermined directivity that defines the irradiated region on the object; and wherein the light-receiving element has a light-receiving end that confronts the object and that is located on the central axis of the light-receiving element, the light-receiving portion being located on the light-receiving end and having another predetermined directivity that defines the detecting region on the object.

3. A reflection-type optical sensor according to claim 1, wherein the light-emitting element emits the detecting light at an emission angle toward the irradiated region on the surface of the object, the light-receiving element receives the reflected light at a light-receiving angle from the detecting region on the surface of the object, and the restricting portion decreases the amounts of both of the emission angle and the light-receiving angle.

4. A reflection-type optical sensor according to claim 1, wherein the restricting member includes a wall portion that is located between the object and the light-emitting portion and the light-receiving portion.

5. A reflection-type optical sensor according to claim 4, wherein the light-emitting element and the light-receiving element are disposed, with a distance from the light-emitting portion to the wall portion being approximately equal to a distance from the light-receiving portion to the wall portion.

6. A reflection-type optical sensor according to claim 4, wherein the wall portion is formed with a single opening for allowing the passage of both of the part of the detecting light and the reflected light; and the center of the single opening is positioned on a line that extends substantially normal to the surface of the object from an approximate center of a line segment that connects the light-emitting portion to the light-receiving portion.

7. A reflection-type optical sensor according to claim 6, wherein the single opening is circular in shape.

8. A reflection-type optical sensor according to claim 7, wherein the light-emitting element and the light-receiving element are each substantially of a cylindrical shape extending along a corresponding central axis; outer diameters of the light-emitting element and the light-receiving element are each within a range of 2.0 to 2.4 mm; a distance between the light-emitting portion and the light-receiving portion is 2.8 mm; distances from the light-emitting portion to the wall portion and from the light-receiving portion to the wall portion are each 5.0 mm; and the single opening has an inner diameter of 2.5–3.5 mm.

9. A reflection-type optical sensor according to claim 4, wherein the wall portion is formed with a plurality of openings, the plurality of openings including one emission opening for allowing passage of the part of the detecting light and a reception opening for allowing passage of the part of the reflected light;

the center of the reception opening is positioned on another line that is substantially normal to the surface of the object and that extends from a point in a third line segment, the third line segment being defined between the light-receiving portion and the center point of the second line segment.

10. A reflection-type optical sensor according to claim 1, wherein the restricting member includes a cap member, the light-emitting element and the light-receiving element being mounted inside the cap member, the cap member having a wall portion that is located between the object and the light-emitting portion and the light-receiving portion, the wall portion being formed with at least one opening for allowing passage of the part of the detecting light and the part of the reflected light.

11. The reflection-type optical sensor according to claim 1, further comprising:

a holding member that holds the light-emitting element, the light-receiving element, and the restricting member, the light-emitting element and the light-receiving element being arranged in an arranged direction; and a position changing unit that changes a relative position between the holding member and the object in the arranged direction.

12. The reflection-type optical sensor according to claim 1, wherein the overlapping region has one width in an aligned direction, in which the light-emitting element and the light-receiving element are aligned, and another width in another direction that is perpendicular to the aligned direction, the one width being shorter than the another width.

13. A carriage for moving over an object and for detecting the object, the carriage comprising:

a moving member that moves over the object; and a detecting unit that is provided on the moving member and that detects the object to determine a position of the object, the detecting unit including a reflection-type optical sensor, the reflection-type optical sensor including:

a light-emitting element having a central axis extending in a predetermined direction that extends substantially normal to a surface of the object to be detected and having a light-emitting portion that emits a detecting light onto the surface of the object, the detecting light traveling toward the surface of the object to define an irradiated region on the object;

a light-receiving element having a central axis extending parallel with the central axis of the light-emitting element and having a light-receiving portion that receives a reflected light that has reflected off a detecting region on the object, the detecting region and the irradiated region overlapping at an overlapping region on the surface of the object, the irradiated region having a remaining irradiated region other than the overlapping region of the irradiated region, the reflecting region having a remaining reflecting region other than the overlapping region of the reflecting region; and a restricting member having a restricting portion defining an opening that allows a part of the detecting light and a part of the reflected light to pass therethrough, the restricting portion restricting a size of the opening to reduce an area of the overlapping region on the surface of the object.

the irradiated region corresponding to an area on the object that is projected by the detecting light through the opening, the detecting light reflected from the irradiated region having an overlapping light that is reflected from the overlapping region of the irradiated region and a remaining detecting light that is reflected from the remaining irradiated region.

the light receiving portion receiving through the opening the overlapping light that is reflected from the overlapping region, and the restricting portion preventing the remaining detecting light from reaching the light receiving portion.

14. A data processing device, comprising:
a moving member that moves over an object;
a detecting unit that moves together with the moving member and that detects the object, the detecting unit including a reflection-type optical sensor for detecting an edge of the object, the reflection-type optical sensor including:
a light-emitting element having a central axis extending in a predetermined direction that extends substantially normal to a surface of the object to be detected and having a light-emitting portion that emits a detecting light onto the surface of the object, the detecting light traveling toward the surface of the object to define an irradiated region on the object;
a light-receiving element having a central axis extending parallel with the central axis of the light-emitting element and having a light-receiving portion that receives a reflected light that has reflected off a detecting region on the object, the detecting region and the irradiated region overlapping at an overlapping region on the surface of the object, the irradiated region having a remaining irradiated region other than the overlapping region of the irradiated region, the reflecting region having a remaining reflecting region other than the overlapping region of the reflecting region; and
a restricting member having a restricting portion defining an opening that allows a part of the detecting light and a part of the reflected light to pass therethrough, the restricting portion restricting a size of the opening to reduce an area of the overlapping region on the surface of the object.

the irradiated region corresponding to an area on the object that is projected by the detecting light through the opening, the detecting light reflected from the irradiated region having an overlapping light that is reflected from the overlapping region of the irradiated region and a remaining detecting light that is reflected from the remaining irradiated region, the light receiving portion receiving through the opening the overlapping light that is reflected from the overlapping region, and the restricting portion preventing the remaining detecting light from reaching the light receiving portion;

a movement control unit controlling the moving member to move reciprocally;

an object moving unit moving the object in a direction different from a direction, in which the movement control unit controls the moving member to move; and a process executing unit that is moved together with the moving member and that performs, based on detection results obtained by the detecting unit, a data control process including at least one of a data adding process for adding data to the object and a data acquiring process for acquiring data from the object.

15. A data processing device according to claim 14, wherein the restricting member includes a wall portion that is located between the object and the light- emitting portion and the light-receiving portion.

16. A data processing device according to claim 14, wherein the restricting member includes a cap member that encloses therein the light-emitting element and the light-receiving element and that has a wall portion, the wall portion confronting the object and being located between the object and the light-emitting portion and the light-receiving portion, the wall portion being formed with at least one opening for allowing passage of the part of the detecting light and the part of the reflected light.

17. A data processing device according to claim 14, wherein the object is a recording medium; and
wherein the process executing unit includes a print unit that prints various data on the recording medium.

18. A data processing device according to claim 14, wherein a distance from the opening to the object is substantially equal to both of a distance from the light-emitting portion to the wall portion and a distance from the light-receiving portion to the wall portion.

19. A data processing device according to claim 14, wherein the detecting unit detects a leading edge of the object defined in a direction parallel to an object moving direction in which the object moving unit moves the object and edges of the object defined in another direction perpendicular to the direction in which the object moving unit moves the object.

20. A data processing device according to claim 14, wherein the detecting unit detects an edge of the object defined in a moving-member moving direction in which the moving member moves; and
the light-emitting element and the light-receiving element are aligned with the moving-member moving direction.

21. A data processing device according to claim 14, wherein the detecting unit detects an edge of the object defined in a direction perpendicular to a moving-member moving direction in which the moving member moves; and
the light-emitting element and the light-receiving element are aligned with the direction perpendicular to the moving-member moving direction.

22. The data processing device according to claim 14, wherein the light-emitting element and the light receiving element are aligned with a moving-member moving direction in which the moving member moves.

23. The data processing device according to claim 14, wherein the light-emitting element and the light receiving element are aligned with the direction in which the object moves.

24. The data processing device according to claim 14, wherein the overlapping region has one width in an aligned direction, in which the light-emitting element and the light-receiving element aligned, and another width in another direction that is perpendicular to the aligned direction, the one width being shorter than the another width.

25. The data processing device according to claim 14, further comprising a recording head that ejects ink and that is integrally provided with the detecting unit.

* * * * *